United States Patent [19]

Chiancone et al.

[11] Patent Number: 5,055,558
[45] Date of Patent: Oct. 8, 1991

[54] METHOD FOR THE SELECTIVE DEPROTEINIZATION OF WHEY

[75] Inventors: Emilia Chiancone; Maurizio Gattoni, both of Rome, Italy

[73] Assignee: Consiglio Nazionale Della Ricerche, Rome, Italy

[21] Appl. No.: 173,384

[22] Filed: Mar. 25, 1988

[30] Foreign Application Priority Data

Mar. 27, 1987 [IT] Italy .................... 47785 A/87

[51] Int. Cl.$^5$ ................. C07K 17/08; C07K 17/10
[52] U.S. Cl. ............................. 530/386; 530/366; 530/380; 530/416; 530/809; 530/832; 530/833; 530/813; 530/815; 530/816
[58] Field of Search ............. 530/366, 416, 809, 380, 530/386, 813, 815, 816, 832, 833

[56] References Cited

U.S. PATENT DOCUMENTS

| | | | |
|---|---|---|---|
| 2,790,790 | 4/1957 | Klostergaard | 530/833 X |
| 4,436,658 | 3/1984 | Peyrouset et al. | 530/366 X |
| 4,820,348 | 4/1989 | Harju | 530/366 X |

OTHER PUBLICATIONS

Axen et al., Nature, vol. 214 (1967), 1302–1304.
Mosbach, Methods in Immunology, vol. 135, part (B), Academic Press, N.Y. (1987), pp. 30–65.
"Fractionation of Whey Proteins," R. J. Pearce, *Bulletin of the International Dairy Federation,* N. 212, pp. 150–153 (1987).
"Industrial Fractionation of Main Whey Proteins," J. L. Maubois, A. Pierre, J. Fauquant, M. Piot, *Bulletin of the International,* Dairy Federation, N. 212, pp. 154–159 (1987).
"Industrial Isolation of Milk Proteins: Whey Proteins," K. R. Marshall, *Developments in Dairy Chemistry,* Fox ed., Appl. Sc. Publ., London (1982), pp. 339–373.
"Preparative Applications of Subunit Exchange Chromatogrpahy", E. Chiancone and M. Gattoni, *Macromolecular Biorecognition,* pp. 321–332 (1988).

*Primary Examiner*—Howard E. Schain
*Attorney, Agent, or Firm*—Townsend and Townsend

[57] ABSTRACT

A method for the selective extraction of beta-lactoglobulin and other proteins from whey or milk by means of subunit exchange chromatography and for the deproteinization of whey by subsequent chromatography on an ion exchange resin.

12 Claims, 2 Drawing Sheets

METHOD FOR THE SELECTIVE DEPROTEINIZATION OF WHEY

BACKGROUND OF THE INVENTION

The present invention relates to a method for the selective extraction of beta-lactoglobulin from whey or milk and other protein substances from whey. In particular the method consists in the extraction of beta-lactoglobulin from whey by means of subunit exchange chromatography and in the subsequent extraction of the other proteins by chromatography on a suitable ion exchange resin.

Whey, a by-product of the dairy industry, is a highly polluting liquid on account of its high content in protein substances at concentrations of ca 6 g/l.

Whey causes particularly difficult disposal problems on account of its remarkable volume.

On the other hand, the proteins contained in whey are products of potential industrial interest and of a high biological value. The recovery and isolation of these latter in a pure state by the use of economically acceptable methods can be considered an attractive aspect from the commercial view point.

For these reasons, methods have been recently developed for recovering proteins and other components of whey so as to make the latter less polluting (see: K. R. Marshall in "Developments in Dairy Chemistry" (K. K. Fox ed. 1982, Appl. Sci. Pub. London pages 339-373, I. Russell, Tibtech, 1986, 107-108).

The most common methods used so far enable one to obtain products, such as whey powder, whey concentrates, cheeses, such as curd or "Feta" cheese, which have a protein content generally of ca 10-15%.

Other more sophisticated methods, such as ultrafiltration, optionally coupled to absorption on ion exchange beds, permit obtaining protein mixtures, which are practically pure and in their native form (see: D. E. Palmer, Process Biochem., 1977, 12, pages 24-28).

In any case, however, the utilization of the whey proteins for specific end-uses, as, for instance, in the food industry in general, or in products for special diets, is to meet the double requirement of obtaining products with a high protein content and products in which the proteins are in their native form, i.e. with their functional properties intact.

The main component of the proteins of cow milk is beta-lactoglobulin, which constitutes 50% of the whey proteins.

Beta-lactoglobulin is also one of the major allergenic components of milk, particularly in infancy. A selective removal of said component could thus permit utilizing the remaining proteins for the production of dietetic hypoallergenic foodformulas of high additional value. Beta-lactoglobulin occurs in the form of two main genetic variants, named A and B and having a different electrophoretic mobility. It is a dimer of molecular weight 36 000; in the B variant the dimer undergoes a reversible monomerization at pH values in the range 1.8 to 5.2, the extent of which depends upon temperature. In the case of the A variant, such monomerization cannot be easily detected in the pH range 4.5 to 4.7, since the protein tends to polymerize into octamers.

SUMMARY OF THE INVENTION

The method of the present invention consists: in immobilizing beta-lactoglobulin onto a suitable activated matrix; in percolating whey through said activated matrix onto which beta-lactoglobulin has been immobilized and; in percolating the so obtained whey, from which beta-lactoglobulin has been removed, through an ion exchange resin in order to retain the residual proteins. It is possible to recover the beta-lactoglobulin from said matrix by means of a suitable eluent, and the residual proteins from said resin by means of another suitable eluent. The whey free from proteins which is obtained after this treatment is a less polluting substance than the original whey and does not present any disposal problem.

Several polymers, such as, for instance, acrylic resins, polysaccharides and the like, are suitable to be used as matrices onto which beta-lactoglobulin can be immobilized. In particular, several polysaccharides have been found to be fit for such a purpose, as, for instance, starch, cellulose, agarose, or SEPHAROSE TM (Pharmacia, Piscataway, N.J.) and the like. The best results have been obtained with the use of SEPHAROSE TM (Pharmacia, Piscataway, N.J.).

The activation of the matrix can be obtained by treating said matrix with a variety of agents, well known in the art for this purpose, e.g., cyanogen bromide, carbodiimide, tresylchloride and the like. When a SEPHAROSE TM (Pharmacia, Piscataway, N.J.) matrix is used, it has been found that the preferred activating agent is cyanogen bromide. An object of the present invention consists in producing pure beta-lactoglobulin from whey with an industrially convenient procedure.

Another object of the present invention consists in obtaining whey proteins that are suitable for the preparation of dietetic hypoallergenic foodformulas.

A further object of the present invention consists in obtaining whey free from or poor in proteins, the elimination of which solves the ambient pollution problems of dairy industries, which employ high amounts of milk for the production of cheese of various kinds and other dairy products.

The method of this invention takes advantage of the presence of association-dissociation equilibria in beta-lactoglobulin in order to achieve a selective extraction of beta-lactoglobulin from whey. According to the present method—which is a bio-affinity chromatographic method—subunits of polymeric proteins or of proteins which undergo reversible association-dissociation phenomena, after being immobilized onto a solid matrix are employed in order to bind subunits in solution of said proteins or of homologous proteins in a specific manner. Under conditions capable to promote subunit association, said subunits are exchanged between the liquid and the solid phase, so that a part of the associating protein which was initially in solution, will be bound to said matrix in a specific way. Then, under conditions capable to promote dissociation into subunits, the protein which had been bound in a specific manner can be eluted.

The subunit exchange chromatography method enables the selective extraction of beta-lactoglobulin from whey and from milk. The extracted protein is found to be pure upon electrophoresis; it can be lyophilized and solubilized again while maintaining its functional properties intact. By combining an ion exchange column with the chromatographic subunit exchange column the removal of the all remaining whey proteins will be obtained.

From the ion exchange column said proteins can be eluted as a mixture or separately, always in their native state so as to be fit to be lyophilized. By means of subunit exchange chromatography both the main genetic A and B variants of beta-lactoglobulin can be extracted.

DESCRIPTION OF SPECIFIC EMBODIMENTS

The following Example illustrates, in a merely indicative way, the method of the present invention, which could be carried out also using wheys or milks of a different origin, as well as by means of any suitable technologic variant of this method, without departing from the informing principle of the present invention.

EXAMPLE

1. Whey Preparation

A and B beta-lactoglobulins and mixtures thereof were obtained in the form of crystallized products from SIGMA CHEMICAL COMPANY (St. Louis, Mo. 63178 U.S.A.). The whey was obtained from fresh cow milk of the "Centrale del Latte" of Rome (Italy), in the following manner:

The milk was separated from its cream by centrifugation for 10 minutes at 10.000 rev/min in a "Sorvall" centrifuge having an SS-34 type rotor. The fat cake, which had formed, was removed and the skimmed milk was mixed with an equal volume of sodium acetate buffer of I=0.1M at pH 4.65 and stirred for 45 minutes at ambient temperature, while maintaining the pH constant by the addition of small amounts of 1M acetic acid.

The casein precipitated, at such a pH, was removed by centrifugation for 10 minutes at 10.000 rev/min in a centrifuge of the aforementioned type and the supernatant (whey) was dialyzed overnight against the same sodium acetate buffer solution. After the dialysis the whey was clarified by filtration through a Millipore filter of the HA 0.45 m type.

2. Preparation of Immobilized Beta-Lactoglobulin 10 ml of SEPHAROSE ™ (Pharmacia, Piscataway, N.J.) were activated with 0.5 gr of BrCN dissolved in 10 ml of distilled water, while maintaining the pH of the reaction mixture at 11 by addition of 2N NaOH for 4–5 minutes in the cold, according to the method of R. Axén, J. Porath and S. Ernback, (Nature 214, 1302; 1967). The activated matrix was washed with cold 0.05M sodium phosphate buffer at pH 6.7; then to said activated matrix, 120 mg of beta-lactoglobulin (A and B mixture) dissolved in 20 ml of the same phosphate buffer were added. The reaction was allowed to proceed overnight in the cold under gentle stirring.

After washing the gel with the same phosphate buffer any non-covalently bound protein was removed with a dissociating buffer at acid pH, as, for instance, 0.1M NaCl/HCl at pH 2.0.

The concentration of immobilized protein was determined with a "Cary 219" spectrophotometer from the optical spectrum of the resin packed in a cuvette having an optical path of 0.2 cm; as a reference non-activated 4B "SEPHAROSE" was used.

3. Chromatographic Experiments

A) Subunit exchange chromatography

Figure 1A:
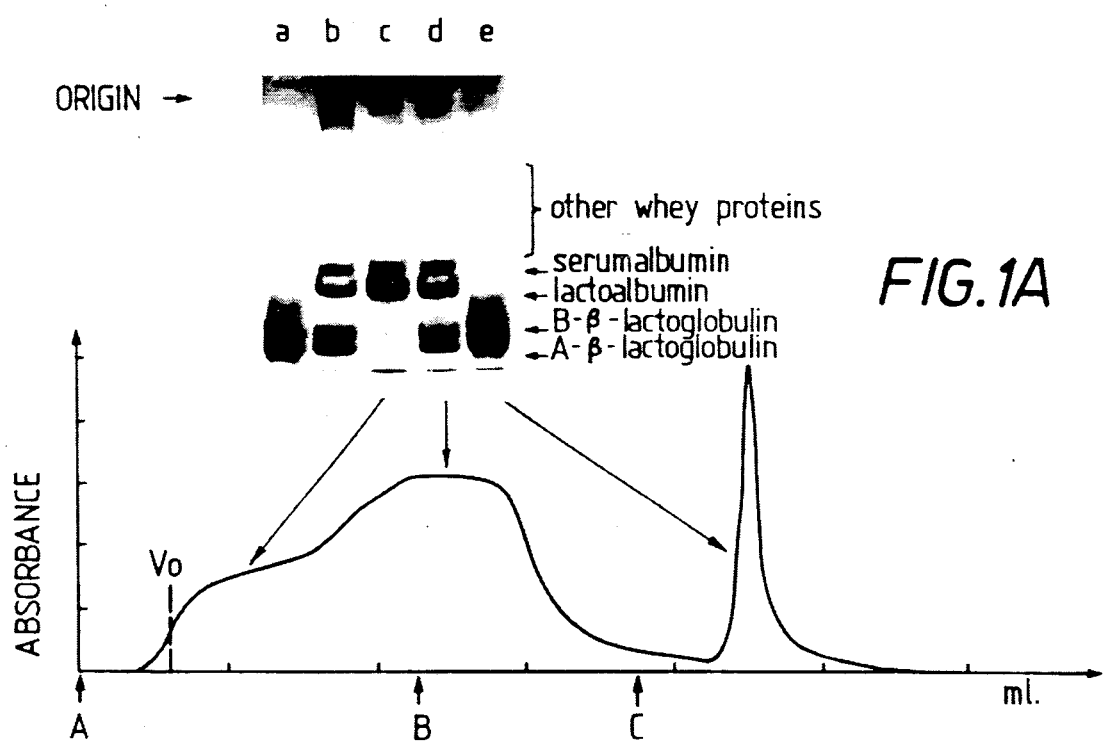
in FIG. 1A and 1B: elution diagrams of whey from a column containing A and B beta-lactoglobulin immobilized onto a SEPHAROSE ™ (Pharmacia, Piscataway, N.J.) matrix, using buffers and temperatures of different types and values respectively; and in FIG. 2: a photo-reproduction of electrophoretic patterns on polyacrylamide gel of whey protein fractions obtained by the combined use of subunit exchange and ion exchange chromatography.

Chromatography experiments were carried out by percolating the whey in 0.1M sodium acetate buffer at pH 4.65 through a column containing beta-lactoglobulin immobilized on SEPHAROSE ™ (Pharmacia, Piscataway, N.J.) and equilibrated with said buffer at a temperature of 8° C. (FIG. 1A).

The amount of whey used was sufficient to establish a steady state. The elution diagram of FIG. 1A shows two distinct sigmoidal profiles.

The first profile at $V_o$ corresponds to the elution of all the inert proteins of whey; the second profile corresponds to the elution of beta-lactoglobulin, which owing to its being retained by the resin, has a greater elution volume.

After washing the column by using the same equilibrating buffer, the retained beta-lactoglobulin was separated by a dissociating buffer at a pH 2.0.

Therefore this procedure enables separation of beta-lactoglobulin from the other whey proteins.

Experiments carried out by the use of a 0.1M sodium acetate buffer at a pH 6.0 at a temperature of 8° and respectively 23° C. (FIG. 1B) showed the same previous behavior.

Deproteinization of Whey

A complete deproteinization of whey could be obtained by associating another column containing "DE 52" cellulose to the aforementioned column of immobilized beta-lactoglobulin.

To this purpose whey in 0.1M acetate buffer at pH 6.0 containing an amount of beta-lactoglobulin that could be retained on the column, was percolated through the column containing immobilized beta-lactoglobulin equilibrated with the same buffer.

Beta-lactoglobulin was retained on the column and could be eluted as described previously, while the remaining proteins were eluted.

Such an effluent, after being diluted in the proportions 1 to 2 with distilled water, was fed directly into a small DE 52 cellulose column equilibrated with the same buffer, i.e. 0.05M sodium acetate at pH 6.0. The whey proteins were bound to the column and could be eluted either all at the same time with 0.1M sodium acetate buffer at pH 4.65 containing 0.2M NaCl, or separately by applying a gradient of ionic strength and/or a pH gradient.

Figure 2:
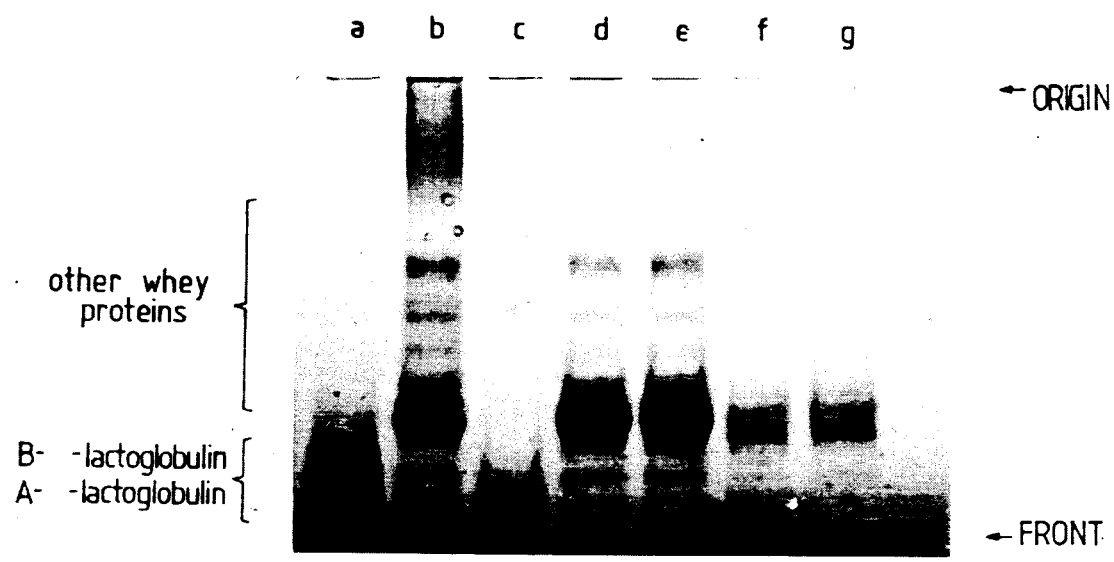

The electrophoretic pattern of FIG. 2 shows the different protein fractions obtained in the various steps of the procedure.

All the obtained proteins could be lyophilized, still maintaining their functional properties intact after rehydration.

Figure 1B:
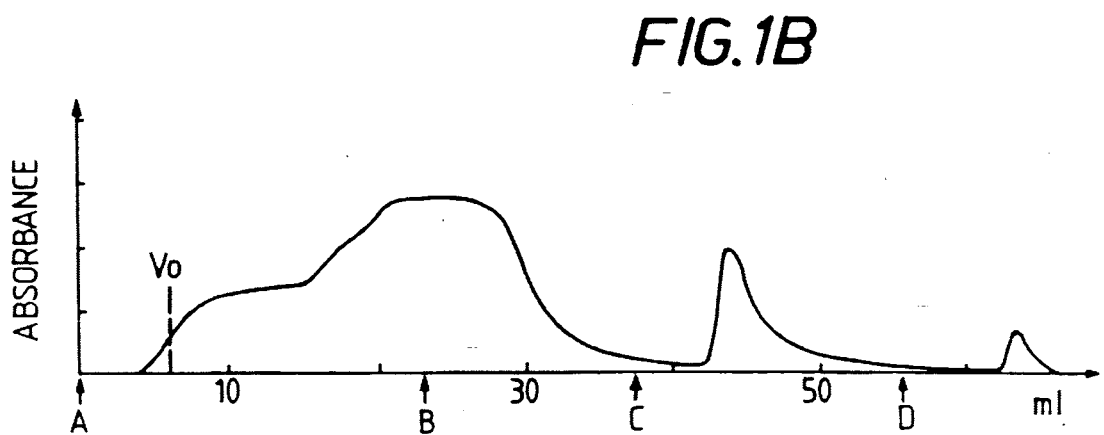

Now referring to FIGS. 1A and 1B, said Figures show the elution profiles of whey through a column containing A and B beta-lactoglobulin immobilized onto SEPHAROSE ™ (Pharmacia, Piscataway, N.J.) in terms of absorbance diagrams as a function of elution volume (ml). The concentration of the protein in the solid phase was 4.1 mg/ml of settled gel and the column volume was 5.0 ml. In FIG. 1A the column had been equilibrated with a 0.1M sodium acetate buffer of pH 4.65, at a temperature of 8° C.

The arrows indicate the application of:

(A) the whey solution at a concentration of 2 mg/ml in the equilibrating buffer;

(B) the equilibrating buffer; and (C) the dissociating buffer consisting of 0.1M NaCl-HCl at pH 2.0

FIG. 1B concerns an experiment carried out with the same column equilibrated with 0.1M sodium acetate buffer at pH 6.0—temperature 23° C.

The arrows indicate the application of:

(A) the whey solution at a concentration of 2 mg/ml in the equilibrating buffer;

(B) the equilibrating buffer;

(C) a dissociating buffer consisting of 0.2M sodium acetate at pH 3.5; and (D) a second dissociating buffer (0.1M NaCl/HCl at pH 2.0). $V_o$ indicates the elution volume of the inert whey proteins that do not interact with the immobilized beta-lactoglobulin.

The insert illustrated over FIG. 1A shows the polyacryl amide gel electrophoresis pattern at pH 8.6 of:

(a) commercial A and B beta-lactoglobulin;

(b) the whey solution applied to column;

(c to e) the protein fractions indicated on the elution profile.

FIG. 2 shows the polyacrylamide gel electrophoresis pattern of whey proteins purified by the combined use of a subunit exchange and an ion exchange column of DEAE-cellulose, where:

(a) is a commercial A and B beta-globulin mixture;

(b) whey;

(c) is beta-lactoglobulin purified onto a subunit exchange column; and (d to g) are protein fractions eluted from a DEAE-cellulose column with 0.1M sodium acetate buffer at pH 4.65, containing 0.2M NaCl.

What is claimed is:

1. A method for the selective extraction of β-lactoglobulin from whey or milk, which comprises:

providing a polymeric matrix selected from the group consisting of acrylic resins and polysaccharides;

treating the matrix with a chemically activating agent;

immobilizing β-lactoglobulin onto the chemically activated matrix through covalent bonds; and percolating the whey or milk through the chemically activated matrix having covalently bound β-lactoglobulin under conditions of pH and temperature whereby the β-lactoglobulin in the whey or milk is in a reversible association-dissociation equilibrium and wherein the conditions promote association between the β-lactoglobulin in the whey or milk and the covalently bound β-lactoglobulin.

2. The method according to claim 1 wherein the matrix is a polysaccharide and the chemically activating agent is a compound selected from the group consisting of carbodiimide, tresylchloride, and cyanogen bromide.

3. The method according to claim 2 wherein the polysaccharide is selected from the group consisting of starch, cellulose, agarose, and SEPHAROSE TM.

4. The method according to claim 3 wherein the polysaccharide is SEPHAROSE TM and the chemically activating agent is cyanogen bromide.

5. The method according to claim 4 wherein percolating conditions of the whey or milk include a pH value ranging from about 4.65 to about 6.0 and a temperature ranging from about 8° C. to about 23° C.

6. The method according to claim 3 further comprising percolating an eluant through the chemically activated matrix after percolation of the whey or milk, whereby the β-lactoglobulin associated onto the covalently bound β-lactoglobulin is dissociated.

7. The method according to claim 6 wherein the eluant has a pH value from about 2.0 to about 3.5.

8. A method for the selective extraction of β-lactoglobulin and other protein substances from whey, which comprises:

providing a polymeric matrix selected from the group consisting of acrylic resins and polysaccharides;

treating the matrix with a chemically activating agent;

immobilizing β-lactoglobulin onto the chemically activated matrix through covalent bonds;

percolating the whey through the chemically activated matrix having covalently bound β-lactoglobulin under conditions of pH and temperature whereby the β-lactoglobulin in the whey is in a reversible association-dissociation equilibrium and wherein the conditions promote association between the β-lactoglobulin in the whey and the covalently bound β-lactoglobulin; and feeding the percolated whey through an ion exchange column, whereby the other protein substances are adsorbed.

9. The method according to claim 8 wherein the matrix is a polysaccharide and the chemically activating agent is a compound selected from the group consisting of carbodiimide, tresylchloride, and cyanogen bromide. TM 10. The method according to claim 9 wherein the polysaccharide is selected from the group consisting of starch, cellulose, agarose, and SEPHAROSE TM.

11. The method according to claim 10 wherein the polysaccharide is SEPHAROSE TM and the chemically activating agent is cyanogen bromide.

12. The method according to claim 10 further comprising percolating an acidic eluant through the ion exchange column, whereby the protein substances are dissociated from the ion exchange column.

* * * * *